June 26, 1951        R. F. DAVIS        2,558,609
POWER FACTOR SENSITIVE RELAY
Original Filed Jan. 8, 1945        2 Sheets-Sheet 1
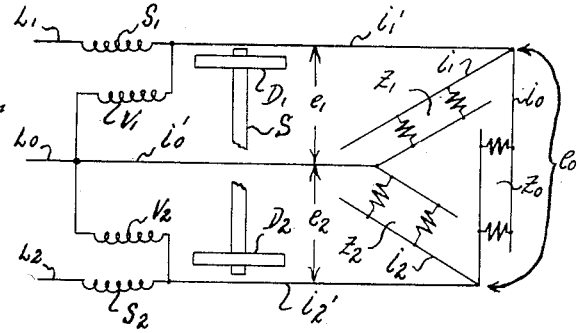
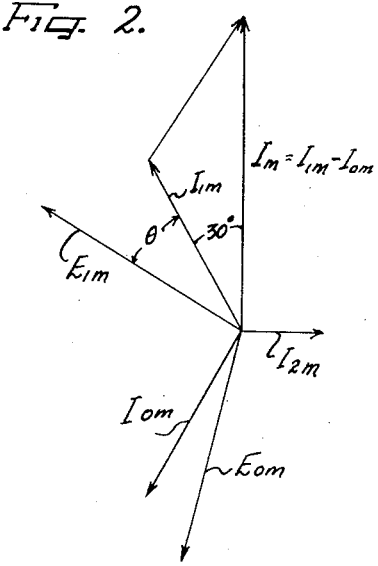
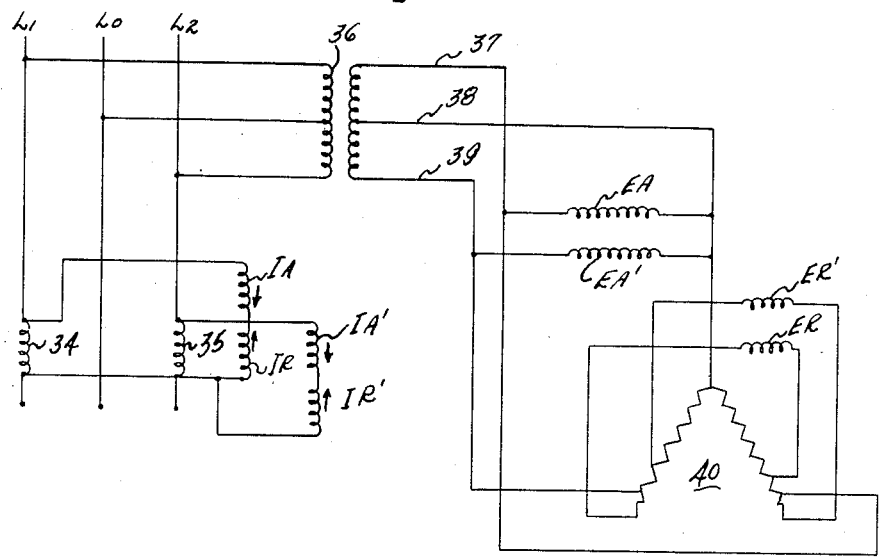
Inventor
Ronald F. Davis
by The Firm of Charles W. Hill
Attys.

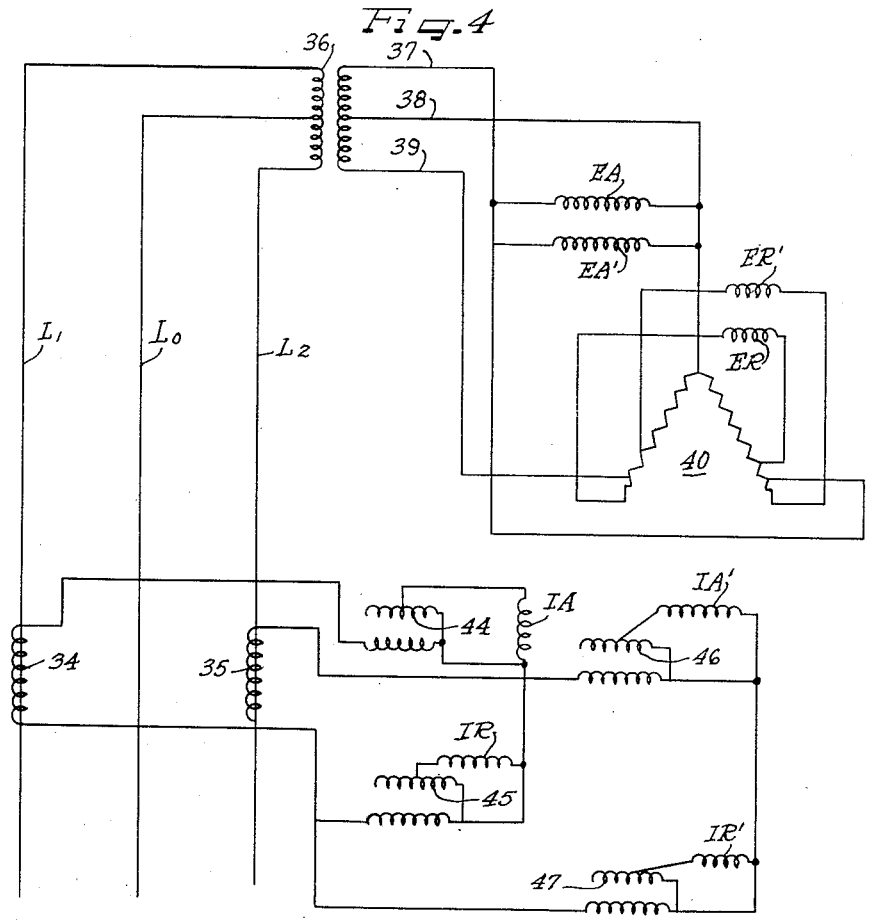
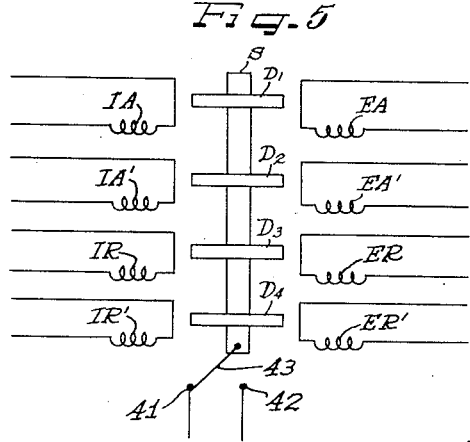

Patented June 26, 1951

2,558,609

UNITED STATES PATENT OFFICE 2,558,609

POWER FACTOR SENSITIVE RELAY

Ronald F. Davis, Sterling, Ill., assignor to Northwestern Steel and Wire Company, Sterling, Ill., a corporation of Illinois Original application January 8, 1945, Serial No. 571,900. Divided and this application March 20, 1947, Serial No. 736,093

4 Claims. (Cl. 175—320)

This invention relates to a power factor meter or relay, and particularly to a power factor relay for effecting a control action in response to the departure of the power factor in a three-phase power circuit from a predetermined value.

This application constitutes a division of my pending application, Serial No. 571,900, filed January 8, 1945, now Patent No. 2,419,988.

In many industrial applications, and particularly in control circuits for electric arc furnaces, there arises the need for a meter or relay which will indicate the departure of the power factor of a polyphase power circuit from a predetermined value, and which will initiate a control action tending to restore the power factor of such circuit to the predetermined value.

In my above-referred to parent application, there is disclosed a method and apparatus for controlling the operation of three-phase electric arc furnaces in response to the departures of the over-all power factor of the supply circuit from a predetermined value, such predetermined power factor value being selected so as to maintain the furnace at an optimum operating condition so far as power input to the arc and overall efficiency is concerned. In such control circuits, it is essential that a power factor relay be provided which will initiate a control action immediately upon the departure of the overall power factor of the particular electric furnace from the predetermined value. Existing power factor relays have been found to be completely unsatisfactory for such application for the reason that known power factor relays were either limited to operation in single-phase circuits or, if adaptable to three phase circuits, were not accurately operable under the unbalanced line current conditions which are always encountered in electric furnace operations.

Accordingly, it is an object of this invention to provide an improved power factor meter or relay for indicating the departure of the power factor in a power circuit from a predetermined value.

A further object of this invention is to provide an improved power factor relay for indicating the departure of the power factor in a three-phase power circuit from a predetermined value and for effecting a control action in response to such departure.

A particular object of this invention is to provide a power factor relay which may be conveniently assembled by suitable electrical and mechanical interconnections of conventional watt meter type meter elements.

The specific nature of the invention, as well as other objects and advantages thereof will become apparent to those skilled in the art from the following detailed description of the annexed sheets of drawings which, by way of preferred example only, illustrate one specific embodiment of the invention.

On the drawings:

Fig. 1 is a schematic view, for mathematical analysis purposes, of a conventional connection of a watt meter type meter elements in a three-phase power circuit for power measuring purposes;

Figure 2 is a vector diagram of currents and voltages in the circuit of Figure 1;

Figure 3 is a schematic circuit diagram of the electrical elements of a power factor meter embodying this invention as applied to a three-phase power circuit;

Figure 4 is a schematic circuit diagram showing a modified power factor meter as applied to a three-phase power circuit, and embodying principles of the present invention; and Figure 5 is a schematic diagram illustrating the physical relationship of the various windings of the power factor meter of Figure 3 with respect to the rotary disk elements of the meter.

As shown on the drawings:

The power factor meter embodying this invention may be conveniently constructed by suitable electrical and mechanical connections of conventional meters of the watt meter type. Those skilled in the art will recognize that most common forms of watt meters embody a pair of coils, which are respectively energized by the current and voltage of the circuit or phase in which the power measurement is to be made, and a movable indicating or output member, generally rotatable, which is moved by the magnetic fluxes produced by the coils, in such a manner that the movement of the output member is proportional to the power flowing in such circuit, which is generally equal to the product of the effective values of line voltage times the line current, times the cosine of the phase angle existing between the line current and line voltage. Or, as commonly expressed, $$P \text{ (Power in watts)} = EL \cos \theta \qquad (1)$$

The foregoing relationships are found in the well known induction type, watt hour meter. It will be recognized that such meters are generically watt meters but through the incorporation of a mechanical integrating mechanism, will indicate the total energy consumed in a power circuit over a period of time or watt hours rather than the rate of consumption of energy which, of course, is measurable in watts. Such induction type watt hour meters embody a voltage responsive coil, a current responsive coil and a disk which is so positioned as to have eddy currents generated therein by the magnetic fields produced by the voltage and current responsive coils. It is well known that the instantaneous torque acting upon the rotary disk of a simple watt hour meter is proportional to the product of the instantaneous voltage across the power circuit or phase by the instantaneous current flowing in such power circuit or phase.

Referring to Figure 1 there is schematically illustrated a well known circuit arrangement for obtaining an indication of either the watts or watt hours of a three-phase delta-connected circuit by utilization of only two watt meter elements. The three line conductors are indicated respectively at $L_0$, $L_1$ and $L_2$. The delta-connected load impedances are indicated by $Z_1$, $Z_2$ and $Z_0$. The load currents and voltages are indicated respectively by $i_1$, $i_2$, and $i_0$, and $e_1$, $e_2$ and $e_0$. The line currents are indicated by $i_0'$, $i_1'$ and $i_2'$. The current coils $S_1$ and $S_2$ of the two watt meter elements are respectively effectively connected in series in lines $L_1$ and $L_2$. The voltage elements $V_1$ and $V_2$ of the two watt meter elements are connected across lines $L_0$ and $L_1$, and $L_0$ and $L_2$ respectively. The watt meters are indicated as of the induction disk type having disks $D_1$ and $D_2$ respectively associated with the two sets of coils and mechanically connected by a common shaft S.

It follows that when the two watt meter elements are connected with a three phase delta load as in Figure 1, Instantaneous power at the load=
$$w = e_0 i_0 + e_1 i_1 + e_2 i_2 \quad (2)$$

and the instantaneous torque $t$ operating on the meter shaft S is proportional to the instantaneous power $p$ effective upon the watt meters and is expressed by $$p = e_1 i_1' + e_2 i_2' \quad (3)$$

but,
$$i_1' = i_1 + i_0$$

and
$$i_2' = i_2 - i_0$$

hence
$$w - p = e_0 i_0 + e_1 i_1 + e_2 i_2 - (e_1 i_1 + e_1 i_0 + e_2 i_2 - e_2 i_0) \quad (4)$$

or,
$$(w-p) = i_0(e_0 - e_1 + e_2) \quad (5)$$

but,
$$e_0 - e_1 + e_2 = 0 \quad (6)$$

therefore,
$$w - p = 0 \quad (7)$$

As the instantaneous torque is therefore proportional to the instantaneous power in the three phase load circuit, the average torque must be proportional to the average power in the circuit regardless of balanced or unbalanced loads.

Referring now to Figure 2, the voltage and current relationship in Figure 1 are there illustrated in vector form for balanced conditions. Thus, $I_{1m}$, $I_{2m}$ and $I_{0m}$ are the maximum values of currents in load impedances $Z_1$, $Z_2$, and $Z_0$ of Figure 1.

For the general case of any power factor existing in the power circuit, we shall assume that $I_{1m}$ is lagging $\theta°$ behind the voltage $E_{1m}$. The vector difference between $I_{1m}$ and $I_{0m}$ is $I_m$ which, for a balanced load, lags 30° behind $I_m$ and $(\theta+30°)$ behind $E_{1m}$. The torque on watt meter disk element $D_1$ is then proportional to $$P_1 = EI \cos(\theta - 30°) \quad (8)$$

and by a similar process of reasoning, it can be shown that the average torque on the other disk $D_2$ of the watt meter element is proportional to $$P_2 = EI \cos(\theta - 30°) \quad (9)$$

where E is the effective voltage between the three phase lines and I is the effective value of current in the line.

It is, therefore, found that as the power factor angle $\theta$ varies from 0 to 90°, the torque acting upon the two interconnected disks $D_1$ and $D_2$ of the two watt meter elements varies from a maximum value equal to $4/\sqrt{3} \, EI$, when $\theta$ equals zero, to a minimum value of 0 when $\theta$ equals 90°, when the respective torques on disks $D_1$ and $D_2$ are equal and opposite.

Thus far, the metering arrangements described have been entirely conventional.

Now in accordance with this invention, two more watt meter elements are connected in the three phase load circuit in the manner illustrated in Figure 3. In this figure, the coils EA and EA' are the voltage-responsive coils of the two conventionally connected watt meter elements having rotary disks $D_1$ and $D_2$ (Figure 5). Likewise coils IA and IA' constitute the current responsive coils of the two watt meter elements having rotary disks $D_1$ and $D_2$. In addition, two additional watt meter elements are provided having rotary disks $D_3$ and $D_4$, voltage responsive coils ER and ER' and current responsive coils IR and IR'. As shown in Figure 5, all of the disks are connected to a common shaft S.

A conventional potential transformer 36 is provided having the three phase, open-delta primary thereof connected across the lines $L_0$, $L_1$, and $L_2$ of the three phase power circuit and the secondary thereof connected by leads 37, 38 and 39 to voltage responsive coils EA and EA'. Also, a phase shifting auto transformer 40 is provided which is connected in open delta across the secondary of potential transformer 36. Voltage responsive coils ER and ER' are respectively connected across phase shifting transformer 40 in such manner that the voltage applied to coil ER is equal in magnitude to that applied across coil EA but shifted 90° in phase with respect thereto. Likewise, the voltage applied to coil ER' is equal in magnitude to that applied to coil EA' but is shifted 90° in phase with respect thereto.

Current transformers 34 and 35 are respectively provided on main lines $L_1$ and $L_2$. Transformer 34 supplies current responsive coils IA and IR in series, but these coils are reversely connected with respect to each other so that the metering fluxes respectively produced by such coils are exactly 180° out of phase, as indicated by the arrows on the drawings. Current transformer 35 is similarly connected to coils IA' and IR' and the polarity of coil IR' is exactly reversed from that of coil IA'. The transformer ratios are such that, under balanced conditions, like currents will flow in each of these coils. All of the disks of the four watt meter elements are suitably mechanically interconnected as by a common shaft S.

From the foregoing description, it is apparent that the effective torques operating upon the rotary disks $D_3$ and $D_4$ are proportional respectively to the powers expressed by the following equations:

$$P_3 = -EI \cos(\theta + 60°) \quad (10)$$
$$P_4 = -EI \cos(\theta + 120°)$$

By converting the cosine expressions to their complementary sine expressions, the following relationships obtain:

$$P_3 = -EI \sin(\theta + 30°) \quad (11)$$
$$P_4 = -EI \sin(\theta + 30°)$$

Comparing these equations with Equations 8 and 9, reveals that the effective torques applied to disks $D_3$ and $D_4$ are proportional to the reactive power in the three-phase circuit. The resultant of the torques on the four disks may be expressed as:

$$T = KEI \cos(\theta - 45°) \quad (12)$$

where K is a constant representing the proportionality of torque to power. This relationship is the result, primarily, of the 90° shift in phase of voltage coils ER and ER'.

From Equation 12 representing the net torque on the disks for balanced load conditions, it is evident that the torque will vary sinusoidally with the power factor angle. In the described arrangement, when $\theta$ equals 45°, or in other words, when a power factor of 70.7% occurs in the main power circuit, the sum of the torques exerted on disk elements $D_1$ and $D_2$ will be equal and opposite to the torques exerted on disk elements $D_3$ and $D_4$. Hence, at this one value of power factor, no movement of the disk shaft S will occur.

This relationship is employed in accordance with this invention to indicate the occurrence of a predetermined power factor in the main power circuits and to produce a control effect in response to departures of the power factor from such predetermined value. Such indication may be conveniently produced by the securing of a contact carrying arm 43 to the common shaft S which is rotatable between two limiting positions of engagement respectively with fixed contacts 41 and 42. At power factor values equivalent to values of the angle $\theta$ greater than 45°, the resultant torque on the common shaft S will move the contact carrying arm 43 into engagement with fixed contact 42. At power factor values corresponding to values of the angle $\theta$ less than 45°, the resultant torque on common shaft S will move the contact carrying arm 43 into engagement with fixed contact 41. At the one value of $\theta$ equals 45°, no resultant torque will be exerted upon the shaft S and the contact carrying arm 43 will tend to position itself between fixed contacts 41 and 42, with a suitable biasing spring (not shown) being attached to the shaft S for this purpose.

The selective engagement of the contact carrying arms 43 with fixed contacts 41 and 42 may be utilized in a variety of ways that will be immediately apparent to those skilled in the art to effect a control action in response to departure of the power factor in the power circuits from the predetermined value of 70.7%. For a specific example of such utilization, reference should be had to my above referred to parent application.

In order to permit a selective variation of the predetermined power factor about which the power factor meter embodying the invention will operate, the modified circuit shown in Figure 4 may be employed. This modification differs from that of Figure 3 only in that variable transformers, for example, of the variable tap ratio type, are connected in the supply lines for the current responsive coils IA, IA', IR and IR'. Such transformers are indicated respectively by the numerals 44, 45, 46 and 47. By varying the tap ratio transformers, the relative energization of the current responsive coils of each of the four watt meter elements may be selectively varied. Hence, the effective torque exerted by each of the watt meter elements is selectively varied, and as a result, such torques may be readily adjusted to balance at a power factor value corresponding to any desired value of the angle $\theta$. Selection of values of the predetermined power factor both above and below a 70.7% power factor may be conveniently accomplished.

It will be apparent to those skilled in the art that the described power factor meter arrangement produces a torque indication of the active power component flowing in the power circuit and opposes such torque indication with a torque indication of the reactive power component flowing in the power circuit. The invention has the particular merit that convention watt meter elements may be employed to assemble a polyphase power factor meter or relay.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A power factor relay for an electric power circuit comprising a first meter of the watt meter type having a pair of energizing coils and a movable output member, means for connecting said coils to the power circuit for energization respectively as a function of the current and voltage in the power circuit to produce a force on said movable output member which is a function of the active power component flowing in the power circuit, a second meter of the watt meter type also having a pair of energizing coils and a movable output member, means for connecting said coils of said second meter to the power circuit for energization respectively as a function of a current and voltage of the power circuit to produce a force on said movable output member which is a function of a reactive power component flowing in the power circuit, means connecting said output members in opposition, whereby said output members are stationary upon the occurrence of a predetermined power factor in the power circuit, variable ratio transformer means in circuit with one of said coils for selectively varying the energization thereof, whereby said predetermined power factor is selectable by operation of said variable transformer, and electric switch means operable by movement of said output members from said stationary position.

2. A power factor relay for a three phase, three wire power circuit comprising four meter elements of the watt meter type having co-rotatable output members, each of said meter elements including current and voltage responsive coils, means for energizing the voltage coil of said first meter element by a voltage which is a function of the line voltage between first and second wires of said circuit, means for energizing the voltage coil of said second meter element by a voltage which is a function of the line voltage between the second and third wires, means for energizing the current coils of said first and second meter elements by voltages which are respectively functions of the line currents flowing in said first and third wires, whereby said first and second meter elements produce a torque on said output member which is a function of the active power component flowing in said power circuit, means for energizing the voltage coils of said third and fourth meter elements respectively by voltages shifted 90° in phase from said voltages applied to the voltage coils of said first and second meter elements, means for energizing the current coils of said third and fourth meter elements by voltages shifted 180° in phase from said voltages applied to said current coils of said first and second meter elements, thereby producing a torque on said output members of the third and fourth meter elements which is a negative function of the reactive power component in said power circuit, and switch means operable by the common movement of said output members.

3. A power factor relay for a three phase, three wire power circuit, comprising four meter elements of the watt meter type having co-rotatable output members, each of said meter elements including current and voltage responsive coils, means for energizing the voltage coil of said first meter element by a voltage which is a function of the line voltage between the first and second wires, means for energizing the voltage coils of said second meter elements by a voltage which is a function of line voltage between the second and third wires, means for energizing the current coils of said first and second meter elements by voltages which are respectively functions of the line currents flowing in said first and third wires, whereby said first and second meter elements produce a torque on said output members which is a function of the active power component flowing in said power circuit, means for energizing the voltage coils of said third and fourth meter elements respectively by voltages shifted 90° in phase from said voltages applied to the voltage coils of said first and second meter elements, means for energizing the current coils of said third and fourth meter elements by voltages shifted 180° in phase from said voltages applied to said current coils of said first and second meter elements, said last mentioned means including variable ratio transformers for selectively varying the magnitude of the voltages applied to said current coils of said third and fourth meter elements, thereby producing a torque on said output members of the third and fourth meter elements which is a selectively variable negative function of the reactive power components in said power circuit, and switch means operable by movement of said output members.

4. In combination in a power factor sensitive relay for a polyphase circuit, a plurality of wattmeter elements, each including a potential coil and a current coil and a rotatable induction disk, a potential transformer having induced secondary voltages, equal to but 90° out of phase with corresponding primary voltages, said primary voltages being phase voltages of said circuit, first and second elements having said primary voltages imposed upon their associated potential coils, third and fourth elements having said secondary voltages imposed upon their associated potential coils, a common spindle connecting the disks of said elements to totalize the torques induced in said disks, bias means operative to return said spindle to a zero total torque position, phase-shifting transformer means interposed in the connection of each said current coil to said circuit, whereby the value of the power factor at which zero torque is induced may be varied, and selective switch means actuated by said spindle in response to variations in said value.

RONALD F. DAVIS.

REFERENCES CITED

The following references are of record in the file of this patent:

UNITED STATES PATENTS

| Number | Name | Date |
|---|---|---|
| 933,746 | Conrad | Sept. 14, 1909 |
| 1,240,710 | Hall | Sept. 18, 1917 |
| 1,695,890 | Fortescue | Dec. 18, 1928 |
| 1,915,095 | Jump | June 20, 1933 |
| 1,916,075 | Rowell | June 27, 1933 |
| 1,929,289 | Rowell | Oct. 3, 1933 |
| 2,064,018 | Leyland | Dec. 15, 1936 |
| 2,300,886 | Goldsborough | Nov. 3, 1942 |

FOREIGN PATENTS

| Number | Country | Date |
|---|---|---|
| 398,838 | Great Britain | Sept. 19, 1933 |